United States Patent Office 3,131,021
Patented Apr. 28, 1964

3,131,021
PROCESS FOR THE COLORATION OF CELLULOSE TEXTILE MATERIALS WITH WATER-SOLUBLE AZO DYESTUFFS CONTAINING SULPHONYL FLUORIDE GROUPS
William Baird, Derek Keith Lawman, William Elliot Stephen, and Charles Douglas Weston, all of Manchester, England, assignors to Imperial Chemical Industries Limited, London, England a corporation of Great Britain
No Drawing. Filed Aug. 7, 1961, Ser. No. 129,532
8 Claims. (Cl. 8—41)

This invention relates to a new coloring process and more particularly it relates to a new process for the coloration of cellulose textile materials with water-soluble azo dyestuffs containing sulphonyl fluoride groups.

It has previously been proposed to manufacture water-soluble azo dyestuffs by coupling diazotised aminoarylsulphonyl fluorides with azoic coupling components containing at least one sulphonic acid group, and to use the dyestuffs so obtained for dyeing animal fibres. It is well known that water-soluble azo dyestuffs which have good affinity for animal fibres usually have poor affinity for cellulose textile materials.

It has now been found that water-soluble azo dyestuffs containing sulphonyl fluoride groups can be used for the coloration of cellulose textile materials by applying the said dyestuffs to cellulose textile materials in conjunction with a treatment with an acid-binding agent, and the colorations so obtained have a surprisingly much higher fastness to wet treatments than the colorations obtained in the absence of the treatment with an acid-binding agent.

According to the invention therefore there is provided a process for coloring cellulose textile materials with an azo dyestuff which contains at least one ionic solubilizing group selected from the class consisting of sulphonic acid and carboxylic acid groups, and which also contains, as the only type of reactive group, at least one sulphonyl fluoride group, which comprises treating the said textile materials with the azo dyestuff and with an aqueous solution of an acid-binding agent.

The coloration of the cellulose textile material may be carried out by both dyeing techniques and printing techniques. The treatment with the acid-binding agent may be carried out prior to, simultaneously with, or after the treatment with the dyestuff. When the acid-binding agent is applied simultaneously with the dyestuff it may conveniently be dissolved in the dyestuff solution or the printing paste containing the dyestuff.

The dyestuff solution, whether acid-binding agent is present or not, may contain commonly used dyebath adjuvants, for example sodium chloride, sodium sulphate, sodium alginate, urea and water-soluble alkyl ethers of cellulose.

The printing paste, whether acid-binding agent is present or not, may contain commonly used adjuvants for example urea and thickening agents for example methyl cellulose, starch and locust bean gum, but it is preferred to use, as thickening agent, an alginate for example sodium alginate.

Dyeing in the presence of an acid-binding agent is preferably carried out at atmospheric temperature, since exhaustion of the dyestuff solution and fixation of the dyestuff on the textile material usually decrease as the temperature of the dyestuff solution is raised.

Dyestuff applied to the textile material from a printing paste containing acid-binding agent may usually be fixed by simply drying the textile material, for example in a heated chamber at temperatures from 40° C. to 70° C. or by passing the printed textile material over a series of steam-heated cylinders. In some cases, however, improved fixation is obtained by steaming the printed textile material for a short period of time, for example 10 minutes or less.

When the acid-binding agent is applied in a separate step before or after the treatment with the dyestuff it is preferably applied by treating the textile material with an aqueous solution of the acid-binding agent, for example by a padding technique. The aqueous solutions of acid-binding agents thus used may also contain commonly used dyebath adjuvants of the kind mentioned above.

Both the solution of the acid-binding agent and the dyestuff solution containing the dyestuff may be applied at temperatures lying over a wide range, conveniently at a temperature lying between room temperature and the boiling point of the solutions. It is preferred to carry out the two treatments at atmospheric temperature. The textile material may, if desired, be dried between the two treatments, and after the application of the acid-binding agent, whichever is the later step, the textile material may be heated for example by steaming, by passage through a heated chamber or a molten metal bath or by passage over heated drying cylinders.

When, in carrying out a printing process, a steaming step is included, other types of dyestuff may also be applied alongside the dyestuffs defined above, and the process using an aftertreatment with acid-binding agent may be advantageously used for printing with the dyestuffs defined above, together with dyestuffs which on heating or steaming evolve acidic vapors or are fixed by treatment with acids or acid vapors. Such dyestuffs include, for example, the leuco-sulphuric esters of vat dyestuffs obtained by the reaction of coloring matters containing halogenomethyl groups with tertiary amines or thioureas.

Thus the process of the invention may be conveniently carried out by treating the cellulose textile material with an aqueous solution of the acid-binding agent and then immersing the so-treated cellulose textile material in a dyebath comprising a solution of one or more of the said azo dyestuffs, at a temperature of between 0° and 100° C., removing the dyed cellulose textile material from the dyebath, and if desired subjecting the dyed cellulose textile material to a treatment in a hot aqueous solution of soap.

If desired the cellulose textile material which has been treated with an aqueous solution of the acid-binding agent may be passed between rollers to remove excess aqueous solution of the acid-binding agent and/or dried before being treated with the aqueous solution of the said dyestuffs.

Alternatively the aqueous solution of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution of one or more of the said dyestuffs, which also contains an acid-binding agent, passing the so-treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution of one or more of the said dyestuffs which also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution of one or more of the said dyestuffs can be applied to the cellulose textile material by a dyeing or a padding method and the colored cellulose textile material subsequently immersed in an aqueous solution of the acid-binding agent, preferably at a temperature between 50° C. and 100° C., or alternatively the colored cellulose textile material may be padded with an aqueous solution of the acid-binding agent, the textile material dried and then subjected to the action of heat or steam. Alternatively the cellulose textile material can be dyed by immersing it in a dyebath comprising an aqueous solution of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution of the dyestuffs is not critical but it is preferred to use between 0.1% and 10% of the acid-binding agent based on the total weight of the aqueous solution.

Alternatively the cellulose textile materials can be colored by applying a printing paste containing one or more of the said dyestuffs to a cellulose textile material which has been impregnated with an acid-binding agent and thereafter subjecting the printed cellulose textile material to the action of heat or steam. Alternatively a printing paste containing one or more of the said dyestuffs and containing an acid-binding agent can be applied to the cellulose textile material and the printed cellulose textile material subsequently subjected to the action of heat or steam. Alternatively a printing paste containing one or more of the said dyestuffs can be applied to the cellulose textile material which is subsequently immersed in a hot aqueous solution of the acid-binding agent, or alternatively the printed textile material is impregnated with an aqueous solution of the acid-binding agent, and the textile material subsequently subjected to the action of heat or steam.

The cellulose textile material may be printed with the printing paste by any of the commonly known methods of applying printing pastes to textile materials, for example by means of roller printing, screen printing, block printing, spray printing or stencil printing.

At the conclusion of the dyeing and/or printing processes it is preferred to subject the so-colored cellulose textile materials to a "soaping" treatment, which may be carried out by immersing the colored cellulose textile materials for a short time, for example 15 minutes, in a hot aqueous solution of soap and/or detergent, and subsequently rinsing the colored cellulose textile material in water before drying it.

As examples of acid-binding agents which may be used in the process of the invention there may be mentioned caustic alkalis such as sodium hydroxide or potassium hydroxide, alkali metal salts of weak acids in particular alkali metal salts of carbonic acid, such as sodium carbonate, potassium carbonate or sodium bicarbonate, trisodium phosphate or sodium metasilicate.

The water-soluble azo dyestuffs used in the process of the invention may be polyazo dyestuffs but are preferably monoazo dyestuffs which contain at least one ionic solubilizing group, which is preferably a sulphonic acid group. If desired the azo dyestuffs may contain coordinately bound metal atoms such as coordinately bound copper, cobalt or chromium atoms. During the process of the invention the sulphonyl fluoride group or groups present in the dyestuff react with the hydroxy groups present in the cellulose textile materials so that the azo dyestuffs become attached to the cellulose textile materials through chemical bonds, and, as previously stated the azo dyestuffs used in the process of the invention contain no reactive groups, that is to say groups which are also capable of reacting with the hydroxy groups present in cellulose textile materials, other than sulphonyl fluoride groups.

The azo dyestuffs used in the process of the invention may themselves be obtained by diazotising a primary amine, which can be an aminoazo compound, and coupling the diazo compound so obtained with a coupling component, wherein the primary amine and the coupling component together contain at least one sulphonyl fluoride group and at least one ionic solubilizing group.

The primary amines used to obtain the said azo dyestuffs may be members of any of the known series of diazotisable primary amines, but preferably they are primary amines of the benzene or naphthalene series which optionally contain an arylazo group such as a substituted or unsubstituted phenylazo or naphthylazo group.

The coupling components used to obtain the said azo dyestuffs may be members of any of the known series of coupling components but preferably they are coupling components of the acylacetoarylide, arylamine, phenol, naphthol, 5 aminopyrazole or 5-pyrazolone, in particular 1-aryl-5-pyrazolone, series.

As examples of primary aromatic amines which may be used to obtain the azo dyestuffs used in the process of the invention there may be mentioned aniline, aniline-2-, 3- or 4-sulphonic acid, aniline-2-, 3- or 4-carboxylic acid, aniline-2:4- or 2:5-disulphonic acid, aniline-2-, 3- or 4-sulphonyl fluoride, 5-amino-2:4-dimethylbenzenesulphonyl fluoride, 2-amino-3:5-dimethylbenzenesulphonyl fluoride, 4-amino-2-methylbenzenesulphonyl fluoride, 3-amino-4-methylbenzenesulphonyl fluoride, 3-amino-4-chlorobenzenesulphonyl fluoride, 3-amino-4-methoxybenzenesulphonyl fluoride, 3-amino-4-trifluoromethylbenzenesulphonyl fluoride, 5-aminobenzene-1:3-disulphonyl fluoride, 2-phenoxy-5-aminobenzenesulphonyl fluoride, 3-sulphoaniline-5-sulphonyl fluoride, 2-sulphoaniline-5-sulphonyl fluoride, 4-methyl-2-sulphoaniline-5-sulphonyl fluoride, 4-nitroaniline-2-sulphonyl fluoride, 2-methylsulphonylaniline-4-sulphonyl fluoride, 2-aminophenol-4- or 6-sulphonic acid, 2-aminophenol-4:6-disulphonic acid, 2-aminophenol-4-sulphonyl fluoride, 4-chloro-2-aminophenol-6-sulphonic acid, 6-nitro-2-aminophenol-4-sulphonic acid, 2-napthylamine-3-carboxylic acid, 2-naphthylamine-6- or 8-sulphonic acid, 2-naphthyamine-4:8-, 6:8-, 5:7-, or 3:7-disulphonic acid, 4-aminoazobenzene-3:4-disulphonic acid, 2-methyl-4-amino-5-methoxyazobenzene-3'-sulphonyl fluoride, 2:5-dimethoxy-4-aminoazobenzene-3'-sulphonyl fluoride, 4-amino-3-ethoxy-2'-methylazobenzene-5'-sulphonyl fluoride, 4-amino-1-(2'-methylphenylazo)naphthalene-5'-sulphonyl fluoride, 4-amino-3-methyl-2'-chloro-4'-nitroazobenzene-2'-sulphonyl fluoride and 2-(4'-amino-2'-fluorosulphonylphenylazo)naphthalene-4:8-disulphonic acid.

As examples of coupling components which may be used to obtain the azo dyestuffs in the process of the invention there may be mentioned acylacetoarylides such as acetoacetanilide, acetoacetanilide-3- or 4-sulphonic acid and acetoacetanilide-3- or 4-sulphonyl fluoride; phenols such as p-cresol, 3:4-dimethylphenol and 4-acetylaminophenol; heterocyclic coupling components such as 2:4-dihydroxyquinoline and barbituric acid; arylamines such as 2-naphthylamine-3:6- or 5:7-disulphonic acid, 1-naphthylamine-5-, 6-, 7- or 8-sulphonic acid, N:N-diethylaniline, N:N-di(β-hydroxyethyl)-m-toluidine and N-ethyl-N-sulphobenzylaniline; naphthols such as 1-naphthol-4- or 5-sulphonic acid, 1-naphthol-3:6-disulphonic acid, 1-naphthol-3:6:-trisulphonic acid, 2-naphthol, 2-naphthol-6- or 8-sulphonic acid, 2-naphthol-3:6-disulphonic acid, 2-naphthol-3:6- or 6:8-disulphonic acid, 2-naphthol-3:6:8-trisulphonyl fluoride, 1-amino-7-naphthol, 1-acetylamino-7 - naphthol, 1 - benzoylamino - 7-naphthol, 2-amino-5-naphthol-7-sulphonic acid, and the N-phenyl, N-sulphophenyl, N-benzoyl, N-acetyl and N-methyl derivatives thereof, 2-amino-8-naphthol-6-sulphonic acid and the N-phenyl, N-sulphophenyl, N-benzoyl, N-acetyl and N-methyl derivatives thereof, 2-amino-5-naphthol-1:7-disulphonic acid, 1-amino-8-naphthol-3:6- or 4:6-disulphonic acid and the N-phenyl, N-sulphophenyl, N-benzol, N-acetyl and N-methyl derivatives thereof, and 1- amino-8-naphthol-4-sulphonic acid; 5-aminopyrazoles such as 1-phenyl-3-methyl-5-aminopyrazole; and 5-pyrazolones such as 1:3-dimethyl-5-pyrazolone, but more especially 1-aryl-5-pyrazolones such as 1-phenyl-3-methyl-5-pyrazolone, 1-phenyl-5-pyrazolone-3-carboxylic acid, 1-(2'-, 3'- or 4'-sulphophenyl)-3-methyl-5-pyrazolone, 1-(6':8'- or 5':7'-disulphonaphth-2'-yl)-3-methyl-5-pyrazolone, 1-(6' or 7'-sulphonaphth-1'-yl)-3-carboxy-5-pyrazolone, 1-(2'-, 3'- or 4'-sulphophenyl)-5-pyrazolone-3-carboxylic acid, 1-(2':5'-disulphophenyl)-3-methyl-5-pyrazolone and 1-(2':5'-dichloro-4'-sulphophenyl)-3-methyl-5-pyrazolone.

One preferred class of azo dyestuffs which are used in the process of the invention are the monoazo dyestuffs which are represented by the formula:

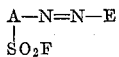

wherein A represents a phenylene radical which may carry additional substituents and E represents the radical of a coupling component of the 5-pyrazolone or naphthol series which contains at least one sulphonic acid group.

As examples of additional substituents which may be attached to the phenylene radical represented by A there may be mentioned chlorine atoms or sulphonic acid, sulphonyl fluoride, methyl, methoxy, acetylamino or hydroxy groups.

A second preferred class of azo dyestuffs used in the process of the invention are the monoazo dyestuffs which are represented by the formula:

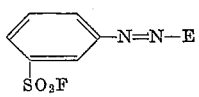

wherein E has the meaning stated above.

A third preferred class of azo dyestuffs for use in the process of the invention are the metal complexes, which are preferably the copper, chromium or cobalt complexes, of the monoazo compounds of the formula:

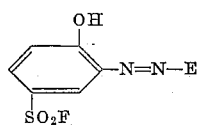

wherein E has the meaning stated above.

As examples of cellulose textile materials which can be colored by the process of the invention there may be mentioned textile materials comprising cotton, viscose rayon and linen.

The colorations on cellulose textile materials produced by the process of the invention possess a high degree of fastness to wet processing, for example to repeated washing or to storage in a moist acid atmosphere.

The invention is illustrated but not limited by the following examples in which the parts and percentages are by weight:

*Example 1*

100 parts of a bleached plan weave cotton fabric are padded at 50° C. with an aqueous solution containing 2% of the yellow dyestuff obtained by coupling diazotised 3-amino-benzenesulphonyl fluoride with 1-(4'-sulphophenyl)-3-carboxy-5-pyrazolone and 0.2% of a highly sulphonated oil. The fabric is squeezed between rollers so that it weighs 200 parts and is then dried by a continuous passage through a hot flue dryer at 110° C. The fabric is then padded at ordinary temperatures with a solution containing 1% sodium hydroxide and 30% sodium chloride, squeezed between rollers so that its weight is 200 parts and then washed successively in water, 2% aqueous sodium bicarbonate solution, boiling 0.2% soap solution and water and is finally dried. The fabric is colored bright yellow and is fast to light and mild washing.

*Example 2*

The dyestuff used in Example 1 is replaced by the dyestuff obtained by coupling diazotised 3-aminobenzene- sulphonyl fluoride with 1-p-toluenesulphonamido-8-hydroxynaphthalene-3:6-disulphonic acid.

The fabric is dyed a red shade which is fast to washing and to light.

*Example 3*

100 parts of viscose rayon are agitated for 30 minutes at 20° C. in a solution containing 90 parts of sodium chloride and 1.5 parts of the dyestuff used in Example 1 in 3,000 parts of water. 3 parts of anhydrous sodium carbonate are then added and the treatment is continued for 1 hour. The rayon is then rinsed in water, boiled for 10 minutes in a 0.3% aqueous solution of a detergent, rinsed in water and dried. The viscose rayon is dyed a bright yellow shade. In place of the 100 parts of viscose rayon used in the above example there are used 100 parts of linen when a similar result is obtained.

*Example 4*

A printing paste is made up with the following composition:

| | Parts |
|---|---|
| Dyestuff used in Example 1 | 5 |
| Urea | 10 |
| Water | 33 |
| Sodium alginate (4% aqueous solution) | 50 |
| Sodium bicarbonate | 2 |

This printing paste is applied to mercerised cotton fabric on a roller printing machine. The fabric is dried and then steamed for 2 minutes. The print is then washed in cold water and treated for 5 minutes at 100° C. in a 0.2% aqueous soap solution then rinsed in water and dried. The bright greenish-yellow print so obtained possesses good fastness to light and mild washing.

*Example 5*

A printing paste is made up with the following composition:

| | Parts |
|---|---|
| Dyestuff used in Example 1 | 5 |
| Urea | 10 |
| Water | 35 |
| Sodium alginate (40% aqueous solution) | 50 |

The printing paste is applied by roller printing to mercerised cotton fabric which has been previously padded in a 0.3% aqueous solution of caustic soda and dried. After printing on the treated fabric it is dried at 100–105° C. by passing the fabric round steam heated copper drying cylinders.

The print is then washed in cold water and treated at 100° C. for 5 minutes in a 0.2% aqueous soap solution, rinsed in water and dried. The bright greenish-yellow print so obtained possesses good fastness to light and to mild washing.

*Example 6*

A piece of woven cotton cloth is padded through an aqueous solution, at a temperature of 50° C., containing 1% of the disodium salt of 1-acetylamino-7-(3'-fluorosulphonylphenylazo)-8-naphthol-3:6-disulphonic acid, 0.2% of a condensate of ethylene oxide with octylphenol, and the woven cotton cloth is then squeezed between rollers until its weight has doubled. The cotton cloth is then dried at 70° C., padded through an aqueous solution containing 30% of sodium chloride and 0.5% of sodium hydroxide, and the cotton cloth is finally steamed for 60 seconds at a temperature of 102° C. The cotton cloth is then rinsed in water, immersed for 5 minutes in a boiling 0.3% aqueous solution of soap, rinsed again in water and finally dried.

The cotton cloth is thereby colored a yellowish-red shade which possesses excellent fastness to storage in a moist acid atmosphere.

The following table gives further examples of the shades obtained on cellulose textile materials when the dyestuffs used in any of Examples 1, 3, 4, 5 or 6 are replaced by equivalent amounts of the sodium salts of the azo dyestuffs which are obtained by diazotizing the amine listed in the second column of the table and coupling the diazo compound so obtained with the coupling component listed in the third column of the table.

This application is a continuation-in-part of our application Serial No. 680,009, which was filed in the United States Patent Office on August 23, 1957.

What we claim is:

1. Process for the coloration of cellulose textile materials with an azo dyestuff which contains at least one ionic solubilising group selected from the class consisting of sulphonic acid and carboxylic acid groups, and which also contains as the only type of reactive group, at least one sulphonyl fluoride group, which comprises treating the said textile materials with the said dyestuff and with an aqueous solution of an acid-binding agent.

| Example | Amine | Coupling component | Shade |
| --- | --- | --- | --- |
| 7 | Aniline-3-sulphonyl fluoride | 1-(4'-sulphophenyl)-3-methyl-5-pyrazolone | Greenish-yellow. |
| 8 | do | 1-(3'-sulphophenyl)-3-methyl-5-pyrazolone | Do. |
| 9 | do | 1-(2'-carboxy-4'-sulphophenyl)-3-methyl-5-pyrazolone | Do. |
| 10 | do | 1-(3'-sulphamylphenyl)-3-carboxy-5-pyrazolone | Do. |
| 11 | do | 1-(4':8'-disulphonaphth-2'-yl)-3-methyl-5-pyrazolone | Do. |
| 12 | 3-fluorosulphonylaniline-5-sulphonic acid | 1-(4'-sulphophenyl)-3-methyl-5-pyrazolone | Do. |
| 13 | 3-fluorosulphonylaniline-6-sulphonic acid | do | Do. |
| 14 | Aniline-2-sulphonyl fluoride | 1-(4'-sulphophenyl)-5-pyrazolone-3-carboxylic acid | Yellow. |
| 15 | Aniline-4-sulphonyl fluoride | do | Do. |
| 16 | Aniline-3:5-disulphonyl fluoride | do | Greenish-yellow. |
| 17 | do | do | Yellow. |
| 18 | 4-methylaniline-3-sulphonyl fluoride | do | Do. |
| 19 | 2:4-dimethylaniline-5-sulphonyl fluoride | do | Do. |
| 20 | 2:4-dimethylaniline-6-sulphonyl fluoride | do | Do. |
| 21 | 4-chloroaniline-2-sulphonyl fluoride | do | Greenish-yellow. |
| 22 | 2-chloroaniline-5-sulphonyl fluoride | do | Do. |
| 23 | do | Acetoacetanilide-4-sulphonic acid | Do. |
| 24 | 2-methoxyaniline-5-sulphonyl fluoride | 1-(4'-sulphophenyl)-5-pyrazolone-3-carboxylic acid | Yellow. |
| 25 | 4-methyl-2-sulphoaniline-5-sulphony fluoride | 1-(4'-sulphophenyl)-3-methyl-5-pyrazolone | Do. |
| 26 | 3-sulphoaniline-5-sulphonyl fluoride | 1-(2':5'-dichloro-4'-sulphophenyl)-3-methyl-5-pyrazolone | Greenish-yellow. |
| 27 | 2-sulphoaniline-5-sulphonyl fluoride | do | Do. |
| 28 | do | Acetoanilide-3-sulphonic acid | Do. |
| 29 | do | 2-(3'-sulphophenylamino)-8-naphthol-6-sulphonic acid | Brown. |
| 30 | Aniline-3-sulphonyl fluoride | 2-naphthylamine-3:6-disulphonic acid | Reddish-orange. |
| 31 | do | 2-naphthylamine-5:7-disulphonic acid | Yellowish-orange. |
| 32 | do | 1-naphthol-3:6-disulphonic acid | Reddish-orange. |
| 33 | do | 1-naphthol-3:6:8-trisulphonic acid | Brick red. |
| 34 | do | 2-naphthol-6-sulphonic acid | Orange. |
| 35 | do | 2-naphthol-6:8-disulphonic acid | Do. |
| 36 | do | 2-naphthol-3:6-disulphonic acid | Do. |
| 37 | do | 2-amino-8-naphthol-6-sulphonic acid | Pink. |
| 38 | do | 1-chloro-8-naphthol-3:6-disulphonic acid | Reddish-orange. |
| 39 | do | 1-acetylamino-8-naphthol-3:6-disolphonic acid | Red. |
| 40 | do | 1-acetylamino-8-naphthol-4:6-disulphonic acid | Do. |
| 41 | do | 2-acetylamino-5-naphthol-1:7-disulphonic acid | Orange. |
| 42 | 2:4-dimethylaniline-6-sulphonyl fluoride | 2-acetylamino-8-naphthol-6-sulphonic acid | Red. |
| 43 | 2-sulphoaniline-5-sulphonyl fluoride | 2-acetylamino-5-naphthol-7-sulphonic acid | Orange. |
| 44 | Aniline-2:5-disulphonic acid | 2-naphthol-3:6-disulphonyl fluoride | Do. |
| 45 | Aniline-3:5-disulphonic acid | do | Do. |
| 46 | Aniline-2:4-disulphonic acid | do | Do. |
| 47 | Aniline-2:5-disulphonic acid | 2-naphthol-3:6:8-trisulphonyl fluoride | Do. |
| 48 | Aniline-3:5-disulphonic acid | do | Do. |
| 49 | Aniline-2:4-disulphonic acid | 1-(4'-fluorosulphonylbenzoylamino)-8-naphthol-3:6-disulphonic acid. | Bluish-red. |
| 50 | 2-naphthylamine-6:8-disulphonic acid | do | Do. |
| 51 | do | 2-naphthol-3:6-disulphonyl fluoride | Red. |
| 52 | Aniline-4-sulphonyl fluoride | N-ethyl-N-sulphobenzylaniline | Orange. |
| 53 | 4-nitroaniline-2-sulphonyl fluoride | 2-naphthylamine-3:6-disulphonic acid | Violet. |
| 54 | 2-methanesulphonylaniline-4-sulphonyl fluoride | do | Do. |
| 55 | Aniline-4-sulphonyl fluoride | do | Orange. |
| 56 | do | 1-benzoylamino-8-naphthol-3:6-disulphonic acid | Reddish-blue. |
| 57 | 2-methyl-4-amino-5-methoxy-3'-fluorosulphophenylazobenzene. | 2-amino-5-naphthol-1:7-disulphonic acid | Violet. |
| 58 | 2:5-dimethoxy-4-amino-3'-fluorosulphonylazobenzene-6'-sulphonic acid. | 1-amino-8-naphthol-3:6-disulphonic acid | Blue. |
| 59 | Aniline-3-sulphonyl fluoride | 1-amino-2-(3'-fluorosulphonylphenylazo)-8-naphthol-3:6-disulphonic acid. | Bluish-black. |
| 60 | 2-sulphoaniline-5-sulphonyl fluoride | p-Cresol | Yellow. |
| 61 | 3-sulphoaniline-5-sulphonyl fluoride | Copper complex of 2:4:2'-trihydroxyazobenzene-3':5'-disulphonic acid. | Brown. |

The following table gives further examples of the shades obtained on cellulose textile materials when the dyestuffs used in any of Examples 1, 3, 4, 5 or 6 are replaced by equivalent amounts of the sodium salts of the metallized azo dyestuffs which are obtained by diazotizing the amine listed in the second column of the table, coupling the diazo compound so obtained with the coupling component listed in the third column of the table and subsequently heating the azo compound so obtained with an aqueous solution of a salt of the metal listed in the fourth column of the table.

2. Process for the dyeing of cellulose textile materials which comprises padding the material through an aqueous solution of a dyestuff as defined in claim 1, thereafter padding the textile material through an aqueous solu-

| Example | Amine | Coupling component | Metal | Shade |
| --- | --- | --- | --- | --- |
| 62 | 2-aminophenol-4-sulphonyl fluoride | 1-amino-8-naphthol-3:6-disulphonic acid | Copper | Bluish-violet. |
| 63 | do | 1-acetylamino-8-naphthol-3:6-disulphonic acid | do | Violet. |
| 64 | do | 2-acetylamino-5-naphthol-1:7-disulphonic acid | do | Rubine. |
| 65 | do | 1-amino-8-naphthol-2:4-disulphonic acid | do | Violet. |
| 66 | do | 1-(2':5'-disulphophenyl)-3-methyl-5-pyrazolone | do | Reddish-yellow. |
| 67 | 2-aminophenol-4:6-disulphonic acid | 2-naphthol-3:6-disulphonyl fluoride | do | Bluish-red. |
| 68 | 2-amino-3-carboxynaphthalene-6:8-disulphonic acid. | do | do | Orange. |
| 69 | 2-aminophenol-4-sulphonyl fluoride | 1-(4'-sulphophenyl)-3-methyl-5-pyrazolone | Chromium | Reddish-yellow. |
| 70 | do | do | Cobalt | Greenish-yellow. |
| 71 | do | 1-phenylamino-8-naphthol-3:6-disulphonic acid | Chromium | Green. |
| 72 | do | 2-(3'-sulphophenylamino)-5-naphthol-7-sulphonic acid. | Cobalt | Reddish-violet. |
| 73 | do | 2-amino-5-naphthol-1:7-disulphonic acid | Chromium | Bluish-violet. |
| 74 | do | do | Cobalt | Reddish-purple. |
| 75 | 5-sulphoanthranilic acid | 2-naphthol-3:6-disulphonyl fluoride | do | Yellowish-brown. | tion of an acid-binding agent and finally subjecting the textile material to an elevated temperature.

3. Process as claimed in claim 2 wherein the textile material which has been padded through the aqueous solution of the dye-stuff is dried before being padded through the aqueous solution of the acid-binding agent.

4. Process for the dyeing of cellulose textile materials which comprises treating the textile material in an aqueous solution of a dyestuff as defined in claim 1, thereafter adding an acid-binding agent to the said solution, and treating the textile material with the solution of dyestuff and acid-binding agent so obtained.

5. Process for the printing of cellulose textile materials which comprises treating the material with a thickened printing paste containing a dyestuff as defined in claim 1 and also containing an acid-binding agent and thereafter subjecting the textile material to an elevated temperature.

6. Process as claimed in claim 1 wherein the dyestuff is a monoazo dyestuff of the formula:

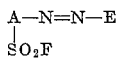

wherein A represents a phenylene radical which may carry additional substituents, and E represents the radical of a coupling component selected from the class consisting of radicals of naphthol and 5-pyrazolone coupling components which contain at least one sulphonic acid group.

7. Process as claimed in claim 1 wherein the dyestuff is a monoazo dyestuff of the formula:

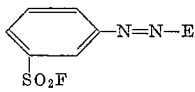

wherein E represents the radical of a coupling component selected from the class consisting of radicals of naphthol and 5-pyrazolone coupling components which contain at least one sulphonic acid group.

8. Process as claimed in claim 1 wherein the dyestuff is a metal complex selected from the class consisting of copper, chromium and cobalt complexes of monoazo dyestuffs of the formula:

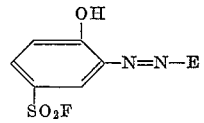

wherein E represents the radical of a coupling component selected from the class consisting of radicals of naphthol and 5-pyrazolone coupling components which contain at least one sulphonic acid group.

References Cited in the file of this patent
UNITED STATES PATENTS

| | | |
|---|---|---|
| 2,154,186 | Schweitzer et al. | Apr. 11, 1939 |
| 2,892,670 | Alsberg et al. | June 30, 1959 |
| 2,892,830 | Stephen | June 30, 1959 |
| 2,977,353 | Stephen | Mar. 28, 1961 |
| 3,074,925 | Heslop | Jan. 22, 1963 |
| 3,084,166 | Booth et al. | Apr. 2, 1963 |